United States Patent
Caillot

(10) Patent No.: US 9,789,854 B2
(45) Date of Patent: Oct. 17, 2017

(54) WIPER ARM WITH PANTOGRAPH DYNAMIC ACTION

(71) Applicant: Valeo Systèmes d'Essuyage, Le Mesnil Saint Denis (FR)

(72) Inventor: Gérald Caillot, Cernay la Ville (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 171 days.

(21) Appl. No.: 14/108,867

(22) Filed: Dec. 17, 2013

(65) Prior Publication Data

US 2014/0165319 A1    Jun. 19, 2014

(30) Foreign Application Priority Data

Dec. 17, 2012 (FR) ..................... 12 62182

(51) Int. Cl.
| | | |
|---|---|---|
| *B60S 1/34* | (2006.01) | |
| *B60S 1/32* | (2006.01) | |
| *B60S 1/38* | (2006.01) | |

(52) U.S. Cl.
CPC .............. *B60S 1/3409* (2013.01); *B60S 1/32* (2013.01); *B60S 1/3406* (2013.01); *B60S 1/3806* (2013.01)

(58) Field of Classification Search
CPC ........ B60S 1/3409; B60S 1/3806; B60S 1/34; B60S 1/3411; B60S 1/3427; B60S 1/3429; B60S 1/3463
USPC ......................................... 15/250.23, 250.21
See application file for complete search history.

(56) References Cited

U.S. PATENT DOCUMENTS

| | | | | |
|---|---|---|---|---|
| 3,404,423 A | * | 10/1968 | Howard ................ | B60S 1/3406 15/250.23 |
| 3,418,678 A | * | 12/1968 | Deibel ...................... | B60S 1/32 15/250.23 |
| 3,893,204 A | * | 7/1975 | Kolb ..................... | B60S 1/3404 15/250.23 |

(Continued)

FOREIGN PATENT DOCUMENTS

| | | | | |
|---|---|---|---|---|
| BE | WO 0140033 A1 | * | 6/2001 | ................ B60S 1/32 |
| DE | EP 0210420 A1 | * | 2/1987 | ............ B29C 45/14 |

(Continued)

OTHER PUBLICATIONS

WO0140033 A1 (machine translation), 2001.*

(Continued)

*Primary Examiner* — Andrew A Horton
(74) *Attorney, Agent, or Firm* — Osha Liang LLP

(57) ABSTRACT

Wiper arm (1) with pantograph dynamic action, comprising a main rod (2*a*) and a secondary rod (2*b*),
characterized in that of the said main rod (2*a*) and secondary rod (2*b*) each comprises a negative lift surface profile the cross section of which is delimited by an upper side (25*a*, 25*b*), a lower side (26*a*, 26*b*), and, in the direction of the air flow, an anterior edge (23*a*, 23*b*) referred to as the leading edge and a posterior edge (24*a*, 24*b*) referred to as the trailing edge opposite the leading edge (23*a*, 23*b*),
and in that, in the position as mounted on a vehicle, the arm (1) is positioned with respect to the vehicle surface that is to be wiped in such a way that the said lower sides (26*a*, 26*b*) of the cross sections of the rods (2*a*, 2*b*) face towards the surface that is to be wiped, so as to press the arm (1) more firmly against the surface that is to be wiped.

9 Claims, 2 Drawing Sheets

(56) References Cited

U.S. PATENT DOCUMENTS

| | | | | |
|---|---|---|---|---|
| 6,122,795 | A | * | 9/2000 | Nakatsukasa ............. B60S 1/32 15/250.201 |
| 6,739,018 | B1 | * | 5/2004 | Jallet ......................... B60S 1/32 15/250.201 |
| 2002/0020034 | A1 | * | 2/2002 | Choi ..................... B60S 1/0491 15/250.351 |
| 2011/0113584 | A1 | * | 5/2011 | Wunsch ................... B60S 1/32 15/250.32 |

FOREIGN PATENT DOCUMENTS

| | | | | |
|---|---|---|---|---|
| DE | WO 9922970 | A1 | * | 5/1999 ............. B29C 49/00 |
| FR | EP 2019006 | A1 | * | 1/2009 ............ B60S 1/0408 |

OTHER PUBLICATIONS

EP2019006A1 (machine translation), 2009.*
WO9922970A1 (machine translation), 1999.*
EP0210420A1 (machine translation), 1987.*

* cited by examiner

WIPER ARM WITH PANTOGRAPH DYNAMIC ACTION

The subject of the present invention is a wiper arm with a pantograph dynamic action.

The invention is intended, notably but not exclusively, to be fitted to motor vehicles that have a panoramic windscreen.

It is known that panoramic windscreens generally comprise portions of small curvature such as the central portion, and portions of high curvature such as the portions situated at the ends. A panoramic windscreen cannot therefore be wiped effectively using a conventional windscreen wiper in which the path of the wiper is circular over the entire surface of the windscreen.

A windscreen wiper of the pantograph type optimizes the effectiveness of wiping by accessing all the portions of the panoramic windscreen thanks to its special structure and special dynamic action which allow the windscreen wiper to be given a non-circular path over at least certain portions of the windscreen, these notably including these portions situated at the ends. A windscreen wiper of this type generally comprises an arm comprising two rods which are substantially parallel to one another in the rest position, which extend substantially in the same plane, and a wiper generally mounted with the ability to pivot relative to the arm. The fact that there is just one arm rather than two as with conventional windscreen wipers also affords a cost saving.

More specifically, by way of example, as has been depicted in FIGS. 1A and 1B, a windscreen wiper of the pantograph type generally comprises an arm 1 comprising a main rod 2a and a secondary rod 2b running longitudinally, substantially parallel to one another in the rest position and which, at least in part, extend substantially in the same plane.

The arm 1 at one of its longitudinal ends comprises at least one pivot 3 allowing it to pivot generally about an axis substantially perpendicular to a plane roughly defined by the surface that is to be cleaned.

In this particular instance, the main rod 2a is connected to this longitudinal end by means of a sleeve 6.

At its other longitudinal end, the arm 1 comprises at least one connecting element 4 which on the one hand allows the two rods 2a, 2b to be joined together and, on the other hand, allows a wiper (not depicted) to be connected. This connecting element 4 is attached to the rods 2a, 2b via two cylindrical sleeves 5a, 5b configured such that one of the ends of the said rods 2a, 2b can be introduced into it. The secondary rod 2b is, on the one hand, connected via the sleeve 5b to the said connecting element 4 and, on the other hand, connected to the longitudinal end of the arm 1 comprising the said pivot 3 by means of a cylindrical sleeve 9 of the aforementioned type.

In an alternative form, the sleeves 5a and 6 and the main rod 2a are made as one piece. Likewise, the sleeves 5b and 9 and the secondary rod 2b may equally be made as one piece.

An electric motor (not depicted) allows the arm 1 to be made to pivot, generating a back and forth wiping action.

Nonetheless, these pantograph-type windscreen wipers suffer from poor aerodynamic performance that affects the effectiveness of their wiping notably because the said arm is not pressed firmly enough against the windscreen.

It is a notable objective of the present invention to rectify this major disadvantage by proposing a wiper arm of the pantograph type that is configured in such a way as to improve aerodynamic performance in order notably to optimize the firm pressing of the arm against the surface that is to be wiped, which generally consists of a windscreen.

To this end, the present invention proposes a wiper arm with pantograph dynamic action, comprising a main rod and a secondary rod, characterized in that of the said main rod and secondary rod each comprises a negative lift surface profile the cross section of which is delimited by an upper side, a lower side, and, in the direction of the air flow, an anterior edge referred to as the leading edge and a posterior edge referred to as the trailing edge opposite the leading edge, and in that, in the position as mounted on a vehicle, the arm is positioned with respect to the vehicle surface that is to be wiped in such a way that the said lower sides of the cross sections of the rods face towards the surface that is to be wiped, so as to press the arm more firmly against the surface that is to be wiped.

The said cross section of the main rod and that of the secondary rod thus have substantially the shape of an aeroplane wing profile that has been made symmetrical with respect to a median plane, it being possible for the lower and upper sides respectively to be considered like the suction face side and pressure face side of the rods. In this way and advantageously, the surface of the profile of the rods becomes a negative lift profile, making it possible to optimize how firmly the said arm is pressed against the surface that is to be wiped. The negative lift of the surface of the profile of the rods is a result of the fact that the air flow is divided at the upstream edge point into:

- a part which flows along the said lower side which is configured in such a way that it causes the stream to accelerate, generating a depression;
- a part which flows along the upper side which is configured in such a way that it causes the stream to decelerate, generating a raised pressure.

The pressure difference thus created between the lower side and the upper side produces a resultant force or negative lift that advantageously allows the arm to be pressed firmly against the surface that it to be wiped.

According to an alternative form of embodiment of the invention, in the position as mounted on the vehicle, the main rod and secondary rod are positioned relative to one another such that with respect to one and the same plane of cross section substantially orthogonal to the surface that is to be wiped, the main rod and the secondary rod are offset horizontally relative to one another in such a way that the leading edge of the secondary rod is situated upstream of the leading edge of the main rod in relation to the said direction in which the air flows over the surface that is to be wiped. The leading edge of the secondary rod is thus generally the first of the edges to come into contact with the stream of air flowing over or near the surface that is to be cleaned when the vehicle comprising it is moving along.

This horizontal offset advantageously allows the stream flowing near the part of the upper side of the secondary rod situated upstream not to be disturbed by the main rod.

According to an alternative form of embodiment of the invention, in the position as mounted on the vehicle, the main rod and secondary rod are positioned relative to one another such that with respect to one and the same plane of cross section substantially orthogonal to the surface that is to be wiped, the main rod and the secondary rod are offset vertically relative to one another so as to create between them a flow duct in which a depression is created by a Venturi effect.

Other features and advantages of the present invention will become apparent from the examples which will follow and from the attached figures, the said examples and figures being given purely by way of nonlimiting illustration.

FIG. 1A, already described, is a view of a wiper arm of pantograph type of the prior art, described hereinabove.

FIG. 1B, already described, is a view of the wiper arm of pantograph type depicted in FIG. 1A, from one longitudinal side.

For the sake of clarity, only the elements essential to understanding the invention have been depicted, schematically, and not to scale.

To assist with understanding, elements common to the various figures will, in the description that follows, bear the same references.

Figure 1A:
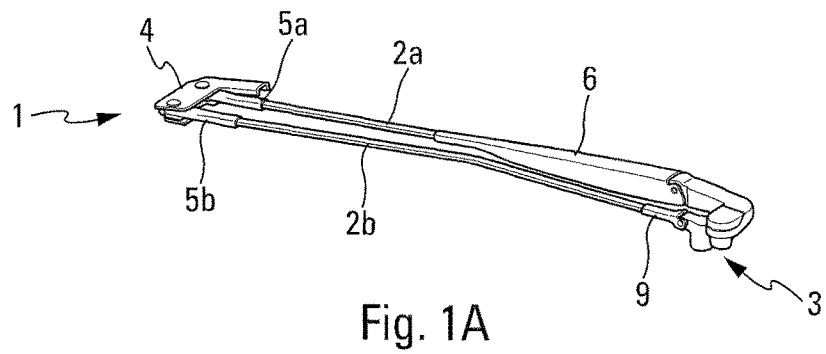
Figure 1B:
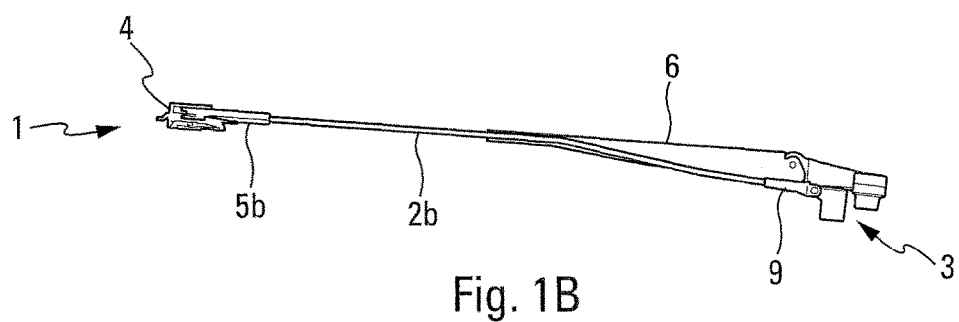
Figure 2A:
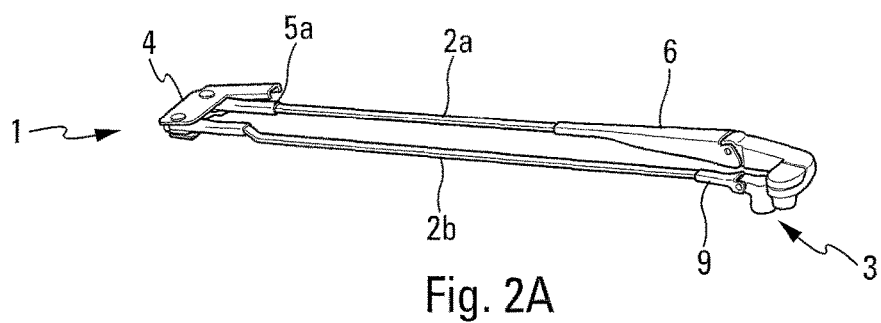
FIG. 2A is a view of a wiper arm of pantograph type according to the invention.
Figure 2B:
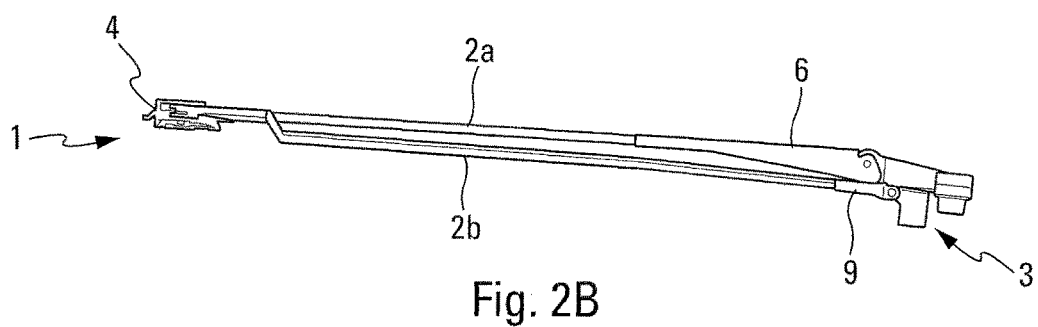
FIG. 2B is a view of the wiper arm of pantograph type depicted in FIG. 2A, from one longitudinal side.

The wiper arm according to the invention, as depicted in FIGS. 2A and 2B, comprises an arm 1 intended to be moved in a back and forth rotational movement about an axis referred to as the axis of wiping which is generally substantially perpendicular to the surface (not depicted) that is to be wiped. This arm 1 comprises a main road 2a and a secondary rod 2b which in this particular instance run longitudinally and substantially parallel to one another.

In this nonlimiting example, the arm 1 comprises:
- at least one pivot 3 of the aforementioned type situated at one of its longitudinal ends;
- at least one connecting element 4 of the aforementioned type situated at its other longitudinal end and to which a wiper (not depicted) may notably be connected;
- at least one sleeve 6 of the abovementioned type that allows the main rod 2a to be connected to the longitudinal end comprising the said pivot 3;
- at least two cylindrical sleeves 5a, 5b of the abovementioned type which respectively allow the secondary rod 2b and the main rod 2a to be attached to the said connecting element 4;
- at least one sleeve 9 of the abovementioned type that allows the secondary rod 2b to be connected to the longitudinal end comprising the pivot 3.

In an alternative form of embodiment of the invention, the sleeves 5a and 6 and the main rod 2a are made as a single piece. Likewise, the sleeves 5b and 9 and the secondary rod 2b may equally be made as a single piece.

Figure 3:
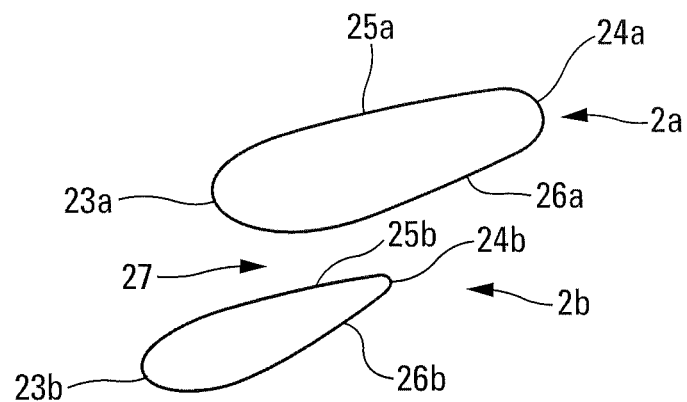
FIG. 3 is a schematic view, in the same cross section, of the main rod and of the secondary rod of the wiper arm according to the invention.
Figure 4:
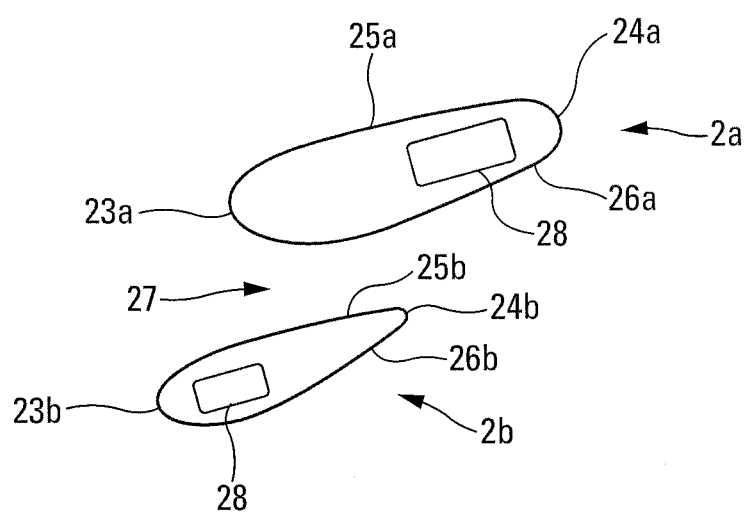
FIG. 4 is a schematic view, in the same cross section, of the main rod and of the secondary rod of the wiper arm according to the invention, showing the support stick inside each of these two rods.

As has been depicted in FIGS. 3 and 4, the transverse and lateral section of the main rod 2a and the secondary rod 2b comprises an upper side 25a, 25b and a lower side 26a, 26b as well as, in the direction in which a stream of air flows, an anterior edge 23a, 23b referred to as a leading edge and a posterior edge 24a, 24b referred to as a trailing edge, opposite the leading edge 23a, 23b.

For preference, in the position as mounted on the vehicle, the main rod 2a and secondary rod 2b are positioned relative to one another so that relative to the same plane of cross section substantially orthogonal to the surface that is to be wiped, the lower sides 26a, 26b of the rods 2a, 2b face towards the surface that is to be wiped.

Further, the length of the said lower sides 26a, 26b is respectively greater than that of the upper sides 25a, 25b.

For preference, the lower sides 26a, 26b have a domed shape which allows them to be longer than the upper sides 25a, 25b.

In this way, the profile of the main rod 2a and secondary rod 2b has a negative lift surface, which notably results in the creation near to the said lower sides 26a, 26b of depression zones.

The flow of air at the upstream edge point divides into:
- a part that flows along each of the said lower sides 26a, 26b, and finds itself accelerated because of their domed shape which forces this part of the air flow to follow a longer path; this acceleration of this part of the flow makes it possible to generate at least one depression zone near each of the lower sides 26a, 26b;
- a part which flows along each of the said upper sides 25a, 25b and finds itself slowed down because of a shorter distance to travel than over the lower sides 26a, 26b; the slowing of this part of the flow makes it possible to generate at least one zone of raised pressure near each of the upper sides 25a, 25b.

The pressure difference thus created between each of the lower sides 26a, 26b and each of the upper sides 25a, 25b produces a resultant force or negative lift directed towards the surface that is to be wiped and that advantageously optimizes the pressing of the said arm 1 firmly against this surface that is to be wiped.

According to an alternative form of embodiment of the invention, in the position as mounted on the vehicle, the main rod 2a and secondary rod 2b are positioned relative to one another such that with respect to one and the same plane of cross section substantially orthogonal to the surface that is to be wiped, the main rod 2a and the secondary rod 2b are offset horizontally with respect to one another in such a way that the leading edge 23b of the secondary rod 2b is situated upstream of the leading edge 23a of the main rod 2a in relation to the direction in which the air stream normally flows over the surface that is to be wiped. The leading edge 23b of the secondary rod 2b is thus generally the first of the edges to come into contact with the air flowing over or near the surface that is to be cleaned when the vehicle comprising it is moving along.

In this way, the air flowing over or near the surface to be cleaned when the vehicle comprising it is moving along, strikes first of all the leading edge 23b of the secondary rod 2b and then the leading edge 23a of the main road 2a. As a result of this, the raised pressure zone created near the leading edge 23b of the secondary rod 2b does not interfere with the depression zone created near the leading edge 23a of the main rod 2a.

In an alternative form of embodiment of the invention, in the position as mounted on the vehicle, the main rod 2a and secondary rod 2b are positioned relative to one another such that with respect to one and the same plane of cross section substantially orthogonal to the surface that is to be wiped, the main rod 2a and the secondary rod 2b are offset vertically relative to one another so as to create between them a flow duct 27 in which a depression is created by a Venturi effect, the air flow being accelerated as it passes along the duct 27. Advantageously, the said horizontal offset between the rods 2a, 2b allows that part of the secondary rod 2b situated upstream of the main rod 2a not to experience the effects generated as the stream of air passes along the flow duct 27. In addition, the Venturi effect accelerates the stream of air flowing near the lower sides 26a, thus increasing the negative lift of the main rod 2a. Furthermore, because of this horizontal offset between the rods 2a and 2b, the acceleration of the flow has no effect on the rear part of the upper side 25b, making it possible to avoid creating lift on the rod 2b. Finally, the two rods 2a, 2b of the arm 1 remain substantially parallel during movements of the arm 1, keeping the Venturi effect constant.

The profile of each rod 2a, 2b may be solid or hollow and may be produced by way of example of a plastic which may be of the composite type, of a magnesium-based alloy, or of aluminium. The hollow profiles of the rods 2a, 2b may be produced notably, although not exclusively, using a method of hydroforming, pressing a metal sheet or by deforming a straight hollow tube.

For preference, each rod 2a, 2b in the conventional way comprises a support stick 28 which may be surrounded by a solid profile of the abovementioned type configured around the stick 28 for example using injection moulding. The profiles of the said rods 2a, 2b may also be configured around the support sticks 28 by overmoulding.

The support stick 28 preferably has a substantially rectangular cross section. However, the shape of the cross section of the support stick 28 may vary according to constraints associated notably with the quality of the overmoulding or with the conditions for clipping the specific profile onto the rods 2a, 2b.

According to another alternative form of embodiment of the invention, the specific profile of each rod 2a, 2b may respectively consist of one or more independent components that can be attached to the stick 28 of the said rods 2a, 2b for example by clip fastening.

For preference, the rods 2a and 2b are configured in such a way that each has at least one housing (not depicted) running longitudinally for the passage of pipes, like the pipe that guides the flow of cleaning and/or deicing fluid and/or of wires such as the electric wires intended to allow the wiper to be a heated wiper.

The invention claimed is:

1. A wiper arm with pantograph dynamic action, comprising:
    a main rod and a secondary rod,
    wherein the said main rod and secondary rod each comprises a negative lift surface profile with a cross section delimited by an upper side, a lower side, and, in a direction of the air flow, an anterior edge referred to as a leading edge and a posterior edge referred to as a trailing edge opposite the leading edge,
    wherein, in a position as mounted on a vehicle, the arm is positioned with respect to a surface of the vehicle that is to be wiped in such a way that the said lower sides of the cross sections of the rods face towards the surface that is to be wiped, so as to press the arm more firmly against the surface of the vehicle that is to be wiped, and
    wherein, in the position as mounted on the vehicle:
        the main rod and secondary rod are positioned on a plane of cross section substantially orthogonal to the surface of the vehicle that is to be wiped,
        a connector holds at least one end of the main rod and at least one end of the secondary rod on a horizontal plane,
        a portion of the secondary rod closest to the at least one end of the secondary rod held by the connector is bent downwards towards the surface of the vehicle that is to be wiped to vertically offset the secondary rod from the main rod, the vertical offset creates a flow duct between the main rod and the secondary rod in which a depression is created.

2. The wiper arm according to claim 1, wherein, in the position as mounted on the vehicle, the main rod and secondary rod are positioned relative to one another such that the anterior leading edge of the secondary rod is situated upstream of the leading edge of the main rod in relation to the said direction in which the air flows over the surface that is to be wiped.

3. The wiper arm according to claim 1, wherein the profile of each rod is made of aluminium or of a magnesium-based alloy.

4. The wiper arm according to claim 1, wherein each rod comprises a support stick around which the specific profile of the rod is configured by overmoulding.

5. The wiper arm according to claim 1, wherein the profile of each rod is hollow and produced using a method of hydroforming or pressing a metal sheet or by deforming a straight hollow tube.

6. The wiper arm according to claim 1, wherein the specific profile of each rod consists respectively of one or more independent components.

7. The wiper arm according to claim 1, wherein the main rod is connected to a first pivot and the secondary rod is connected to a second pivot.

8. A wiper arm with pantograph dynamic action, comprising:
    a main rod and a secondary rod,
    wherein each rod comprises a support stick to which one or more independent components are detachably attached,
    wherein the one or more independent components of the main rod and secondary rod each comprises a negative lift surface profile with a cross section delimited by an upper side, a lower side, and, in a direction of the air flow, an anterior edge referred to as a leading edge and a posterior edge referred to as a trailing edge opposite the leading edge,
    and wherein, in a position as mounted on a vehicle, the arm is positioned with respect to a surface of the vehicle that is to be wiped in such a way that the said lower side of the cross section of the one or more independent components face towards the surface that is to be wiped, so as to press the arm more firmly against the surface of the vehicle that is to be wiped.

9. The wiper arm according to claim 8, wherein the independent component or components are detachably attached to the stick of the said rods by clip fastening.

* * * * *